(12) United States Patent
Byrne et al.

(10) Patent No.: US 10,175,996 B2
(45) Date of Patent: Jan. 8, 2019

(54) INFORMATION DISPLAY AND CONTROL FOR WORK AREAS

(71) Applicants: Norman R. Byrne, Ada, MI (US); Joseph D. Ward, Grand Rapids, MI (US); Randell E. Pate, Jenison, MI (US)

(72) Inventors: Norman R. Byrne, Ada, MI (US); Joseph D. Ward, Grand Rapids, MI (US); Randell E. Pate, Jenison, MI (US)

(*) Notice: Subject to any disclaimer, the term of this patent is extended or adjusted under 35 U.S.C. 154(b) by 0 days.

(21) Appl. No.: 15/499,301

(22) Filed: Apr. 27, 2017

(65) Prior Publication Data

US 2017/0315828 A1  Nov. 2, 2017

Related U.S. Application Data

(60) Provisional application No. 62/330,492, filed on May 2, 2016.

(51) Int. Cl.
| | |
|---|---|
| *G06F 3/14* | (2006.01) |
| *G06F 9/445* | (2018.01) |
| *G04G 9/02* | (2006.01) |
| *G06F 1/16* | (2006.01) |
| *G06F 1/18* | (2006.01) |
| *G06F 3/041* | (2006.01) |
| *G06F 13/10* | (2006.01) |

(52) U.S. Cl.
CPC ........... *G06F 9/44505* (2013.01); *G04G 9/02* (2013.01); *G06F 1/1601* (2013.01); *G06F 1/181* (2013.01); *G06F 1/189* (2013.01); *G06F 3/041* (2013.01); *G06F 13/102* (2013.01)

(58) Field of Classification Search
None
See application file for complete search history.

(56) References Cited

U.S. PATENT DOCUMENTS

| | | |
|---|---|---|
| 8,480,429 B2 | 7/2013 | Byrne |
| 9,300,347 B1 | 3/2016 | Coverstone |
| 9,312,673 B2 | 4/2016 | Byrne et al. |
| | (Continued) | |

OTHER PUBLICATIONS

Woody Leonhard, "Windows 10 All-In-One for Dummies", 2015, for Dummies, pp. 1-34.*

(Continued)

*Primary Examiner* — Cheng Yuan Tseng
(74) *Attorney, Agent, or Firm* — Gardner, Linn, Burkhart & Ondersma LLP (57) ABSTRACT

A power and data housing assembly includes a housing body configured to retain and support an electronic device assembly in the form of an interactive display screen and associated electronics. The electronic device assembly is communicatively coupled to at least one peripheral device. The electronic device assembly is configured to provide interactive functions that include text messaging, time-keeping, calendar functions, calculations, game-playing, and audio/video media playback. The electronic device assembly is further configured to provide interactive control of and display of data from the at least one peripheral device. The electronic device is further configured to mirror a personal computing device's display on the electronic device assembly's display.

24 Claims, 7 Drawing Sheets

(56) References Cited

U.S. PATENT DOCUMENTS

| | | |
|---|---|---|
| 2005/0240346 A1 | 10/2005 | Lin |
| 2007/0049197 A1 | 3/2007 | Klein |
| 2007/0206629 A1 | 9/2007 | Choi |
| 2009/0097363 A1 | 4/2009 | Nyberg |
| 2009/0215501 A1 | 8/2009 | Kim |
| 2010/0022220 A1 | 1/2010 | Gupta et al. |
| 2011/0072083 A1 | 3/2011 | Suetsugu |
| 2011/0096138 A1 | 4/2011 | Grimshaw |
| 2013/0176738 A1 | 7/2013 | Tinaphong et al. |
| 2013/0207778 A1 | 8/2013 | Neafsey et al. |
| 2013/0231161 A1 | 9/2013 | Hsu et al. |
| 2014/0053185 A1 | 2/2014 | Bleacher et al. |
| 2014/0188485 A1 | 7/2014 | Kim et al. |
| 2014/0359712 A1 | 12/2014 | Takayama |
| 2015/0088331 A1* | 3/2015 | Fiedler .................. G05F 1/66 700/295 |
| 2015/0110324 A1 | 4/2015 | Feng et al. |
| 2015/0332580 A1 | 11/2015 | Bokhary |
| 2016/0112988 A1 | 4/2016 | Lee |
| 2016/0174347 A1 | 6/2016 | Parello et al. |
| 2016/0224064 A1 | 8/2016 | Fleisig |
| 2016/0300403 A1 | 10/2016 | Harter et al. |
| 2016/0300404 A1 | 10/2016 | Harter et al. |
| 2016/0300407 A1 | 10/2016 | Harter et al. |
| 2016/0309307 A1 | 10/2016 | Agarwal et al. |
| 2017/0038739 A1 | 2/2017 | Nakamura et al. |
| 2017/0251356 A1 | 8/2017 | Andrade et al. |

OTHER PUBLICATIONS

Commonly owned co-pending application as filed, U.S. Appl. No. 15/583,372, filed May 1, 2017.

Commonly owned co-pending application as filed, U.S. Appl. No. 15/499,331, filed Apr. 27, 2017.

Commonly owned co-pending application as filed, U.S. Appl. No. 15/643,992, filed Jul. 7, 2017.

* cited by examiner

INFORMATION DISPLAY AND CONTROL FOR WORK AREAS

CROSS REFERENCE TO RELATED APPLICATIONS

The present application claims the filing benefits of U.S. provisional application, Ser. No. 62/330,492, filed May 2, 2016, which is hereby incorporated by reference herein in its entirety.

FIELD OF THE INVENTION

The present invention is directed to furniture-integrated power and data channel systems, and more particularly to accessories mounted into power and data channel systems.

BACKGROUND OF THE INVENTION

Conventional power and data systems provide a variety of interconnections and flexibility. Power and data systems may be embedded into walls and integrated into and/or onto furniture, such as office furniture. These embedded and integrated power and data systems typically include outlets or other similar ports arranged into receptacles for mounting into the power and data systems. Example outlets and ports include: high voltage AC outlets, phone ports, low-voltage DC outlets, and USB ports, and their respective assemblies, housings, or housing units.

SUMMARY OF THE INVENTION

The present invention provides for an electronic device assembly that includes a display screen and associated electronics that provide interactive functionality, which includes, for example, test messaging, time-keeping, calendar functionalities, calculations, game-playing, and audio/video media playback. When this electronic device assembly is communicatively coupled with one or more peripheral devices, the electronic device assembly is able to provide additional interactive functionality, which includes, for example, interactive enterprise functionality and control. Furthermore, when the electronic device assembly is additionally or alternatively communicatively coupled to a personal computing device, such as a cellphone, the interactive display of the electronic device assembly can mirror the display of the cellphone, allowing a user to interact with their cellphone.

In one form of the present invention, an exemplary electronic device assembly that includes a display screen and associated electronics, is retained and supported by a housing body of a power and data unit. A plurality of these electronic device assemblies may be arranged in respective power and data units that are spaced throughout a work space. The electronic device assembly is coupled to at least one peripheral device. The display screen and associated electronics are configured to provide interactive control of the at least one peripheral at the display screen. The display screen is further configured to provide information that is communicated to the electronic device assembly from the at least one peripheral device.

In another form of the present invention, a method for providing interactive functionality between a peripheral device and an electronic device assembly retained and supported by a power and data housing assembly comprises communicating peripheral device configuration data from one or more peripheral devices to the electronic device assembly. One or more enterprise functions or controls are provided at the electronic device assembly via an interactive display screen, based upon the configuration data sent by the one or more peripheral devices. The enterprise functions or controls are provided via the interactive display screen of the electronic device assembly that is configured to provide interactive control of the one or more peripheral devices at the interactive display screen, and to further provide information at the interactive display screen that is sent from the one or more peripheral devices.

According to one aspect, electronics associated with the electronic device assembly may be adapted from "smartwatch" technology. The electronic device assembly may include an interactive digital display, such as a touch-sensitive display, capable of providing the user-interactive functions and enterprise functionality and control.

According to another aspect, the electronic device assembly may be wirelessly linked to one or more peripheral devices. Exemplary wireless links include one or more of Bluetooth, near field communications (NFC), and Wi-Fi networks. The electronic device assembly may also be linked via a wired connection with the one or more peripheral devices. Optionally, the peripheral devices may include weather devices such as thermometers, barometers, rain sensors, and wind sensors. The peripheral devices may also include speakers and memory card interfaces. Optionally, the peripheral devices may comprise any electronic device capable of receiving and/or transmitting data to and/or from the electronic device assembly.

According to yet another aspect, the electronic device assembly's display may include a clock or watch face display. Optionally, the display of a portable computing device mirrors the interactive display of a particular electronic device assembly.

In still yet another aspect, the electronic device assembly is operable to serve as a remote control for the one or more peripheral devices.

These and other objects, advantages, purposes and features of this invention will become apparent upon review of the following specification in conjunction with the drawings.

DESCRIPTION OF THE PREFERRED EMBODIMENTS

Referring to the drawings and the exemplary embodiments depicted herein, electronic device assemblies are adapted to be retained and supported by power and data units that may be located in work areas or other locations. An exemplary electronic device assembly is configured to provide interaction functions that include text messaging, time-keeping, calendar functions, calculations, game-playing, and audio/video media playback. The electronic device assembly is also communicatively coupled to one or more peripheral devices, e.g., weather devices, speakers, memory card interfaces, thermostats, lights, and alarm systems. Exemplary peripheral devices can be any electronic device capable of sending and/or receiving data to and/or from the electronic device assembly. The electronic device assembly is further configured to provide interactive control of and display of data from the peripheral device. The electronic device assembly may also be configured to provide enterprise functionalities and control, such as building-specific or area-specific functions, information display, and control, via a peripheral device. Optionally, an electronic device assembly provides an interactive experience that is tailored to particular users, or in the alternative, provides an interactive experience that is independent of the user.

A plurality of power and data units may be arranged throughout the work areas or other locations within a building. Such placement of electronic device assemblies in respective power and data units that were installed in separate locations (e.g., work areas) in a building, allows for a user to move within the building from work area to work area and access respective electronic device assemblies.

Figure 1:
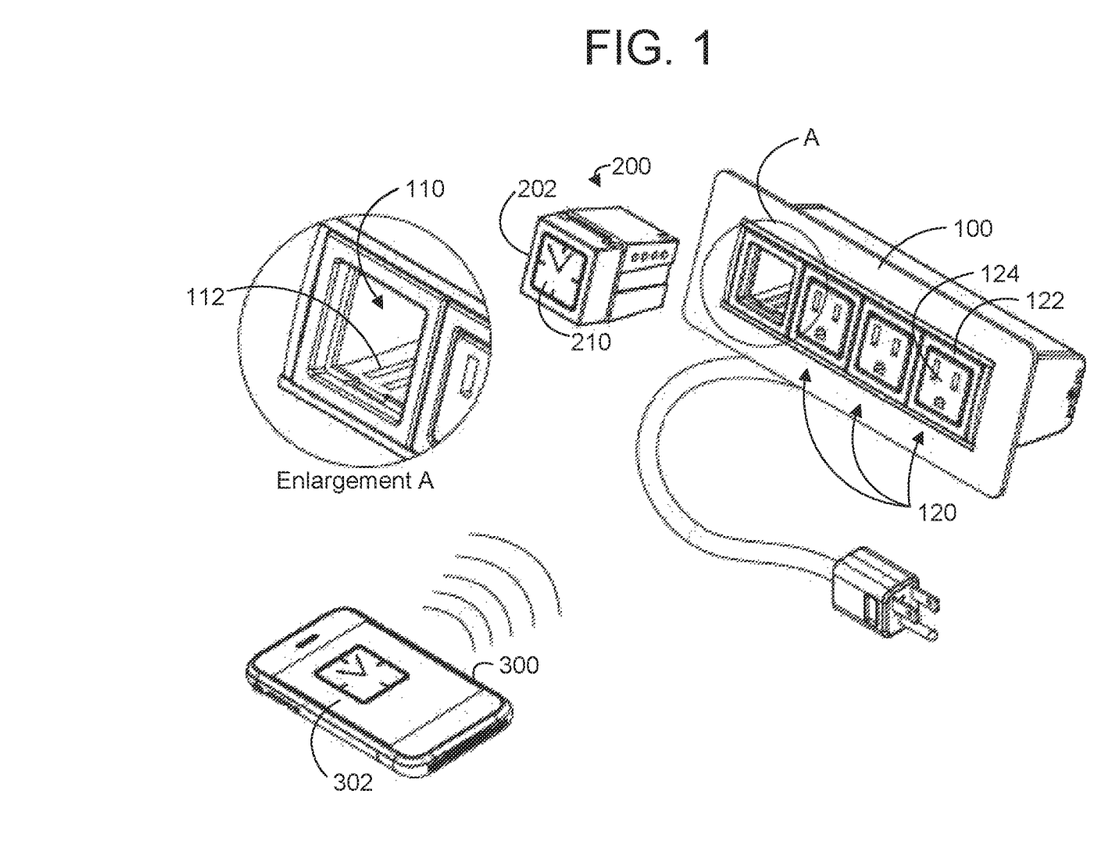
FIG. 1 is a perspective view of an information display and control system in accordance with an embodiment of the present disclosure.

Referring now to FIG. 1, an exemplary extruded power and data housing unit 100 has openings 110 for receiving and supporting electrical or electronic power and/or data receptacles or functional modules, or for providing access to an interior of the power and data unit 100. The portion enclosed by circle "A" is enlarged (see "Enlargement A" in FIG. 1) to illustrate an exemplary opening 110, where an interior of the opening 110 includes a pair of grooves 112 configured to receive corresponding protrusions or ridges 204 formed on accessory device housings, such as found on an electronic device housing 202 of an electronic device assembly 200 (see FIG. 2, including "Enlargement B"). As will be described in subsequent paragraphs herein, and discussed in detail in commonly owned U.S. Pat. No. 8,480,429 issued to Norman R. Byrne, entitled "Power Data Housing" ("the '429 patent"), the disclosure of which is hereby incorporated herein by reference, the power and data housing unit 100 and other power and data housings provide for what can be characterized as receptacle, electrical component, or electronic device housings. Additional embodiments for an exemplary power and data housing are disclosed and discussed in detail in commonly owned U.S. Pat. No. 9,312,673 issued to Norman R. Byrne, entitled "Low Voltage Power Receptacle" ("the '673 patent"), the disclosure of which is hereby incorporated herein by reference.

The power and data housing unit 100 is capable of receiving various types of electrical components. As discussed in the '429 patent mentioned above, one such type of electrical component is a receptacle assembly. As illustrated in FIG. 1, an exemplary power receptacle assembly 120 may comprise a power receptacle housing 122 and a power receptacle 124. As also discussed in the '429 patent and the '673 patent, an exemplary data port assembly may comprise a data port receptacle and data port housing, while an exemplary high definition multi-media interface (HDMI) receptacle assembly may comprise an HDMI receptacle and HDMI housing.

As illustrated in FIG. 1, the openings 110 in the power and data housing unit 100 are configured to receive electronic devices assemblies 200 via their respective housings 202. As illustrated in FIG. 1, and discussed herein, the power and data housing unit 100 is also configured to receive a variety of different accessory assemblies. The openings 110 illustrated in FIG. 1 may also contain receptacle assemblies, such as the above mentioned high-voltage AC outlet receptacles 124 and their housings 122. One or more of the receptacle assemblies 120 may be replaced with additional electronic device assemblies 200 and/or data port assemblies. The electronic device assembly 200 may be configured to interface with a portable computing device, such as a cellphone 300. As illustrated in FIG. 1, a display 210 of the electronic device assembly 200 may mirror a display 302 of the cellphone 300. Optionally, the display 302 of the cellphone 300 mirrors the display 210 of the electronic device assembly 200. Optionally, the electronic device assembly 200 does not interface with a portable computing device, but remains independent of any particular user or interfacing device.

Figure 2:
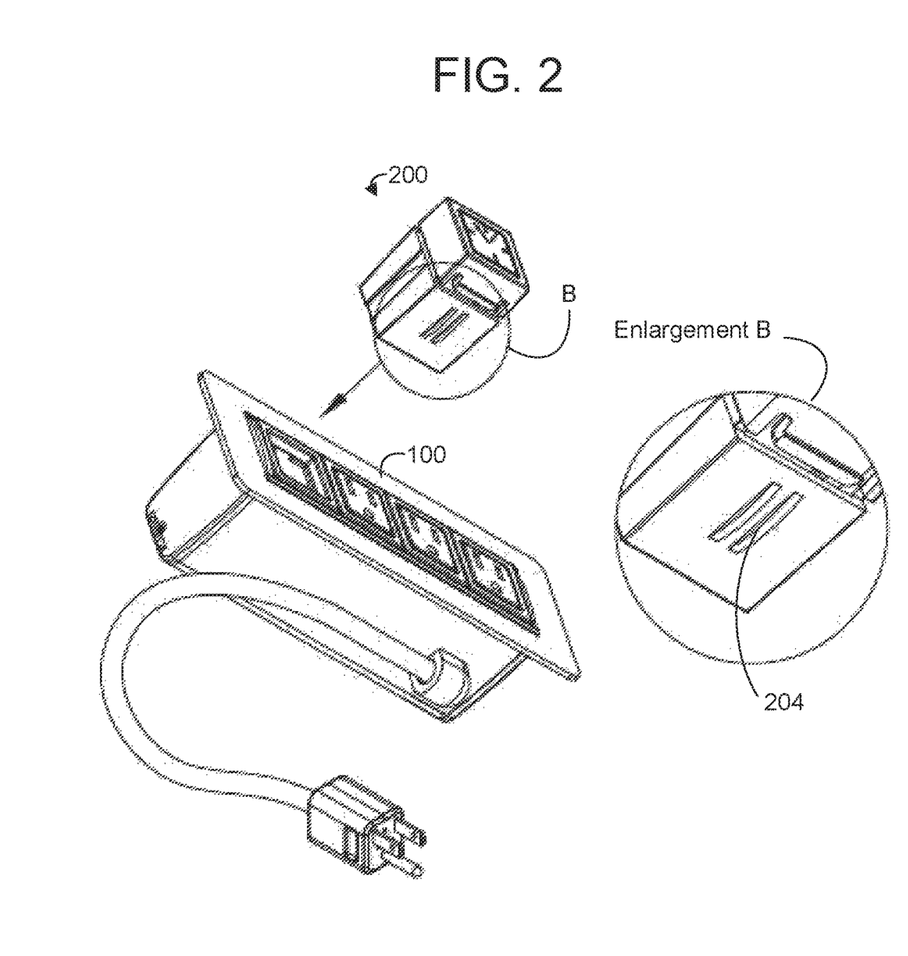
FIG. 2 is a perspective view of an electronic device assembly that inserts into an opening of the power and data housing of FIG. 1 in accordance with an embodiment of the present disclosure.

FIG. 2 illustrates a portion enclosed by a circle "B" that is enlarged (see "Enlargement B" in FIG. 2) to illustrate the corresponding protrusions or ridges 204 that mate with the grooves 112 found in the interior of the opening 110 of the power and data housing unit 100 illustrated in FIG. 1. As also illustrated in FIG. 1, the electronic device assembly 200 is configured to slide into the opening 110 of the power and data housing unit 100.

Figure 3:
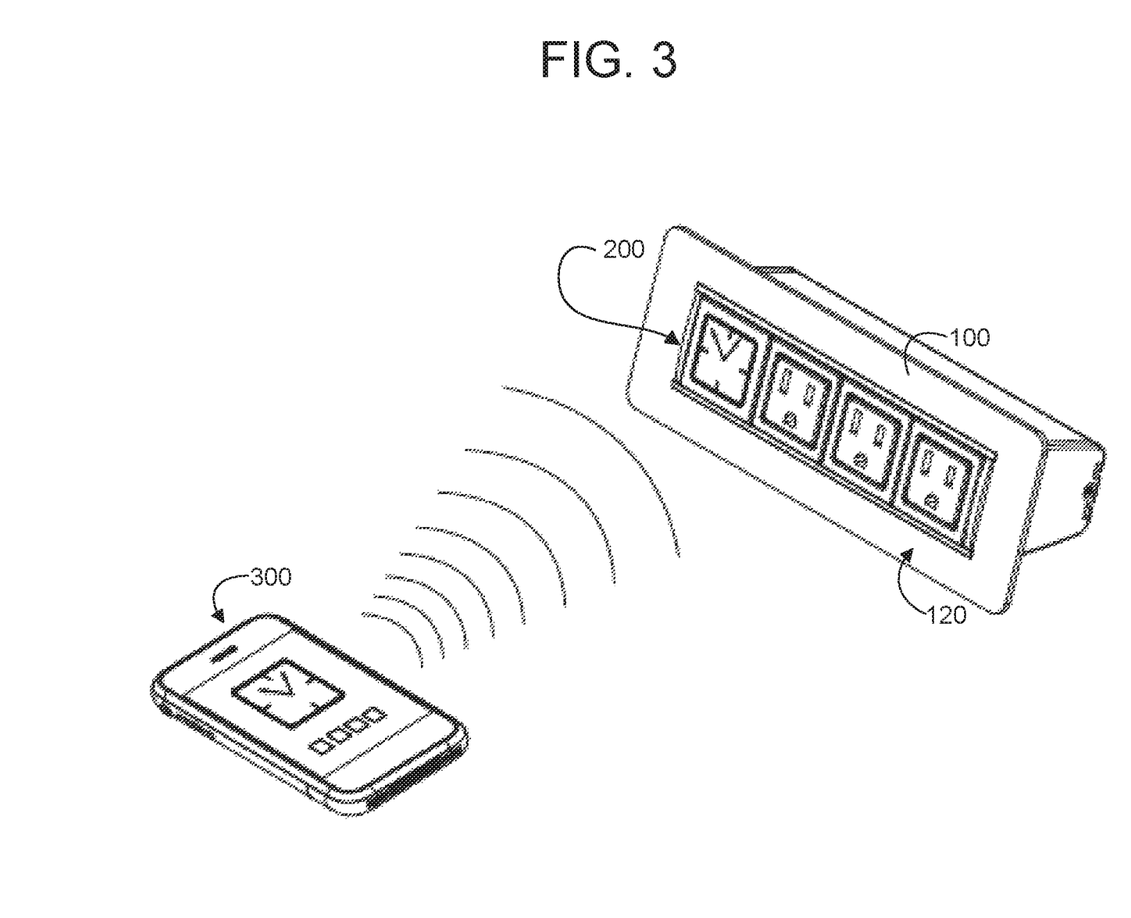
FIG. 3 is a perspective view of the power and data housing of FIG. 1, with an electronic device assembly inserted into the power and data housing and interfacing with a cellphone in accordance with an embodiment of the present disclosure.
Figure 4:
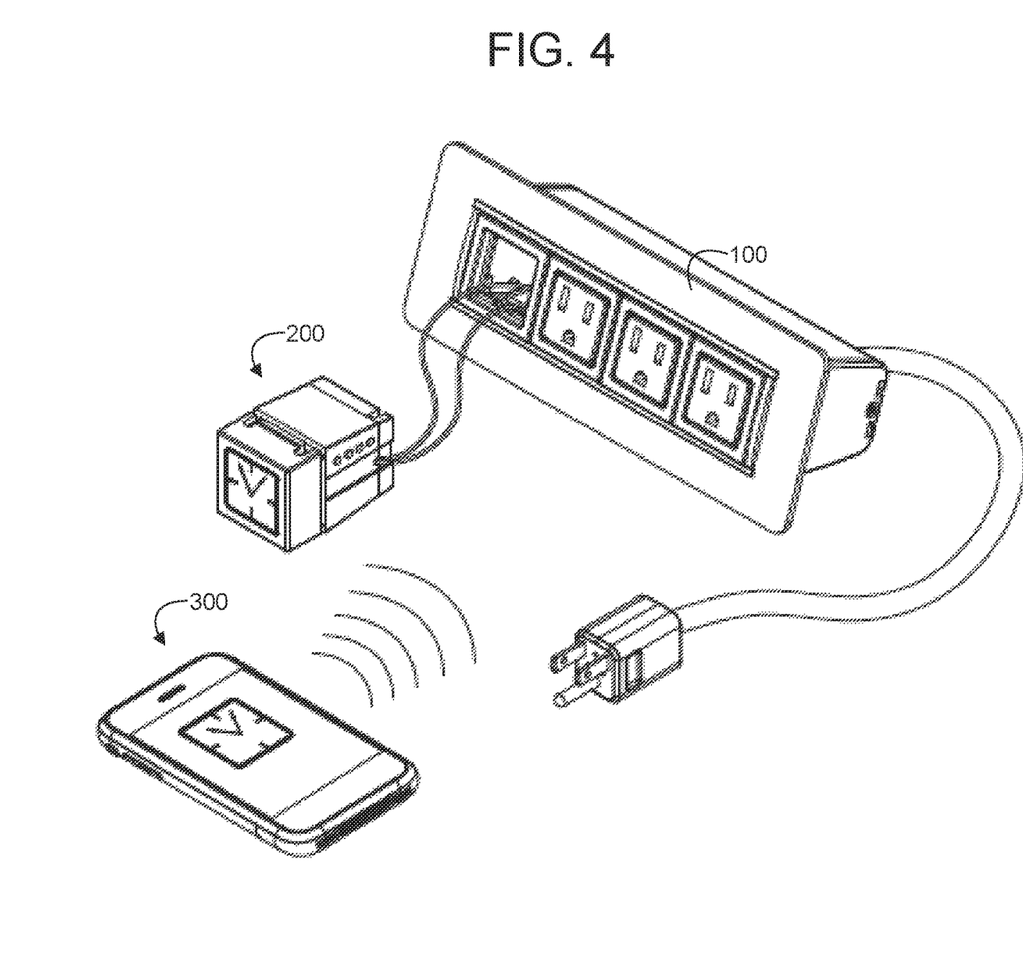
FIG. 4 is another perspective view of the power and data housing of FIG. 1, with an electronic device assembly connected to the power and data housing and interfacing with a cellphone in accordance with an embodiment of the present disclosure.

FIG. 3 illustrates another perspective view of the power and data housing unit 100 with an electronic device assembly 200 and several power receptacles 120. The electronic device assembly 200 interfaces with the cellphone 300 via one or more wireless communications links, such as Bluetooth, near field communications (NFC) and/or Wi-Fi network. Optionally, the cellphone 300 may be linked to the electronic device assembly 200 via a wired connection. As illustrated in FIG. 3, the display 210 of the electronic device assembly 200 mirrors the display 302 of the cellphone 300. As discussed herein, the display 302 of the cellphone 300 may optionally mirror the display 210 of the electronic device assembly 200. FIG. 4 illustrates a perspective view of the power and data housing unit 100 with the electronic device assembly 200 removed from the opening 110 while still wired to the power and data housing unit 100.

Figure 5:
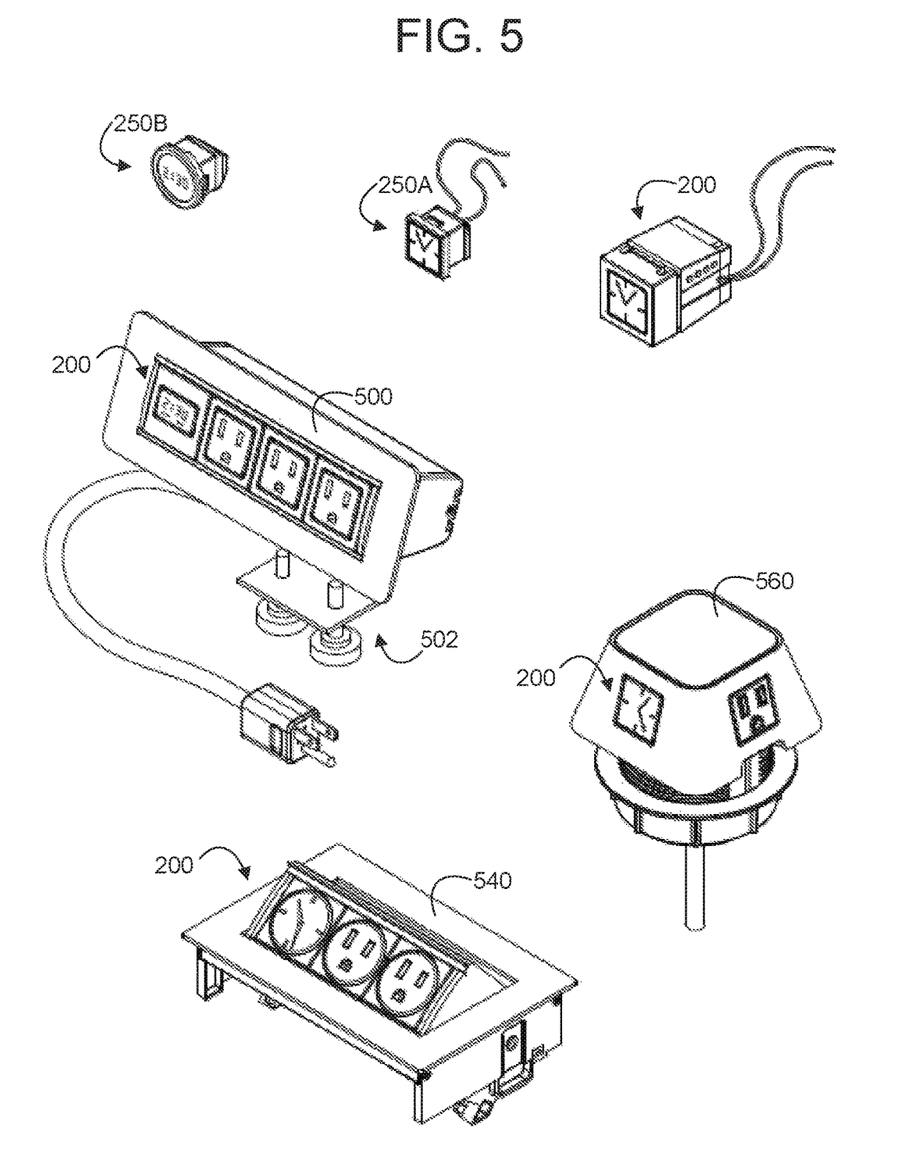
FIG. 5 is an additional perspective view of a variety of power and data systems in accordance with embodiments of the present disclosure.

As illustrated in FIG. 5, and discussed in the '673 patent, there are several possible configurations for a power and data housing unit 100. An exemplary power and data housing unit 500 may be configured with an edge clamp 502 for attaching to the edge of a table or desk surface. An exemplary power and data housing unit 540 may also be configured to be inserted into a horizontal tabletop surface. Lastly, an exemplary power and data housing unit 560 may be configured as a monument or monument-grommet mount for mounting in a horizontal surface of a work surface and/or tabletop. As also illustrated in FIG. 5, the electronic device assembly 200 may be configured into smaller housing units, such as electronic device assembly 250A and electronic device assembly 250B for configurations with increased volume restrictions. Optionally, the electronic device assembly 200 may be configured for a particular display 210 and associated electronics and their particular application(s) or functionalities. FIG. 5 also illustrates exemplary electronic device assemblies 200 retained and supported by respective power and data housing units (500, 560, and 540).

Figure 6:
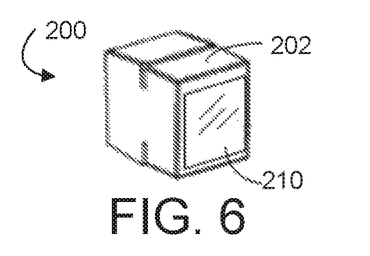
FIG. 6 is a perspective view of an electronic device assembly in accordance with an embodiment of the present disclosure.
Figure 7:
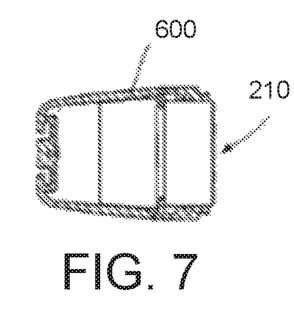
FIG. 7 is a side view of the electronic device assembly of FIG. 6 slidably inserted into a power and data housing in accordance with an embodiment of the present disclosure.
Figure 8:
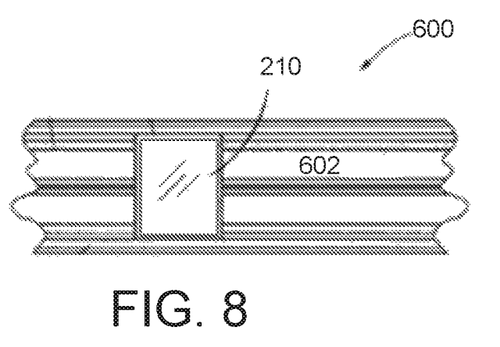
FIG. 8 is a front view of the electronic device assembly and the power and data housing of FIG. 7.

FIGS. 6-8 illustrate exemplary power and data housing unit 600 configured to receive electronic device assembly 200. FIGS. 6-8 illustrate the mating of electronic device assembly 200 with channel 602 of the power and data housing unit 600. For purposes of releasably securing the electronic device assembly 200 within the channel 602, the electronic device housing 202 may include additional appropriate components to be received within and captured by the upper and lower channels of the channel 602, such that the electronic device assembly 200 is slidably inserted into the channel 602. The above power and data housing unit 600 and channel 602 are discussed in detail in the '429 patent.

Figure 9:
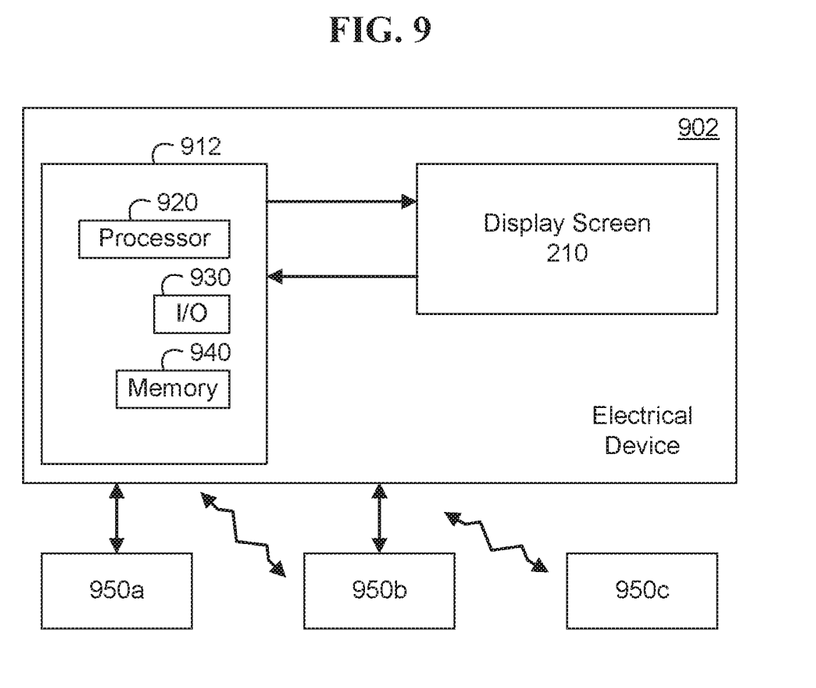
FIG. 9 is a block diagram of an electronic device assembly in accordance with an embodiment of the present disclosure.

As illustrated in FIG. 9, an exemplary electronic device assembly 200 may comprise an electronic device 902 that includes a display screen 210 and associated electronics that may be implemented on a circuit board 912. As also illustrated in FIG. 9, the circuit board 912 may comprise a processor 920, an input/output (I/O) interface 930, and one or more memories 940. The display screen 210 may be a touch-sensitive screen to allow user interaction. Optionally, the electronic device assembly 200 may be substantially similar to an interactive smartwatch's display screen and associated electronics. The electronic device's display screen 210 may include a watch clockface display.

Optionally, an electronic device assembly 200 that includes an interactive display screen 210 and associated electronics 912, may include an interactive digital display capable of providing a combination of user-interactive functions that include, for example: text messaging, time-keeping, calendar functionalities, calculations, game-playing, and audio and/or video media players. Embodiments may also be capable of enterprise functionalities and control (e.g., building-specific or area-specific functions, information display, and control). In other words, the data output of the electronic device 902 may not be personal to an individual user. For example, the electronic device 902 may provide remote control functionality to a room's thermostat and lights or other similar enterprise functionalities.

Referring to FIG. 9, the electronic device assembly 902 may be wirelessly connectable to peripheral devices 950b, 950c, which may be substantially any sensor or control device. The electronic device assembly 902 may be wirelessly connectable via a Bluetooth, near field communication (NFC), and/or Wi-Fi connection(s). Optionally, the electronic device 902 may also be wired and in communication with the peripheral devices 950a, 950b. The communications links of the electronic device assembly 902 may also interface with a portable computer device, such as a cellphone.

The peripheral devices 950a-c may be weather devices, such as thermometers, barometers, rain sensors, and wind sensors (e.g., wind speed, wind direction). The peripheral device 950a-c may also include speakers and memory card interfaces. As discussed herein, the peripheral devices 950a-c may also include thermostats, lights, and other remote functions (e.g., alarm systems). An exemplary peripheral device 950a-c may be any electronic device capable of sending and/or receiving data to and/or from the electronic device assembly 902.

The electronic device assembly 902 may be configured to serve as a remote control for the peripheral devices 950a-c. In other words, the electronic device assembly 902 provides an interactive control of one or more peripheral devices 950a-c. For example, the electronic device 902 may serve as a remote control for a thermostat, an alarm system, or room or building lighting. The remote functionality may be local (e.g., room lights, temperature control, room electronic or lighting systems), or building wide (e.g., alarm and security systems, climate control, and lighting).

Therefore, an exemplary electronic device assembly 200 in the form of an interactive display screen and associated electronics is communicatively coupled to at least one peripheral device. The electronic device assembly 200 is configured to provide interactive functions that include text messaging, time-keeping, calendar functions, calculations, game-playing, and audio/video media playback. The electronic device assembly 200 is further configured to provide interactive control of and display of data from the at least one peripheral device. The electronic device assembly 200 may also be configured to provide enterprise functionalities and control, such as building-specific or area-specific functions, information display, and control.

Changes and modifications in the specifically described embodiments can be carried out without departing from the principles of the present invention which is intended to be limited only by the scope of the appended claims, as interpreted according to the principles of patent law including the doctrine of equivalents.

The embodiments of the invention in which an exclusive property or privilege is claimed are defined as follows:

1. A power and data housing assembly configured to support at least one electronic device, the power and data housing assembly comprising:
   a housing body configured for coupling to a work surface in a work area;
   an AC electrical power output receptacle retained and supported by the housing body;
   an electronic device assembly retained and supported by the housing body, the electronic device assembly comprising an interactive display screen and associated electronics, wherein a face of the AC electrical power output receptacle and the interactive display screen of the electronic device are oriented along respective parallel planes;
   wherein the electronic device assembly is communicatively coupled to, and configured to remotely control, at least one peripheral device;
   wherein the interactive display screen is configured to provide interactive control of the at least one peripheral device at the interactive display screen; and
   wherein the interactive display screen and the associated electronics are operable to display information that is communicated to the electronic device assembly from the at least one peripheral device.

2. The power and data housing assembly of claim 1, wherein the interactive display screen is touch-sensitive.

3. A power and data housing assembly configured to support at least one electronic device, the power and data housing assembly comprising:
   a housing body configured for coupling to a work surface in a work area;
   an AC electrical power output receptacle retained and supported by the housing body;

an electronic device assembly retained and supported by the housing body, the electronic device assembly comprising an interactive display screen and associated electronics, wherein a face of the AC electrical power output receptacle and the interactive display screen of the electronic device are oriented along respective parallel planes;

wherein the electronic device assembly is communicatively coupled to at least one peripheral device;

wherein the interactive display screen is configured to provide interactive control of the at least one peripheral device at the interactive display screen; and wherein the interactive display screen and the associated electronics are operable to display information that is communicated to the electronic device assembly from the at least one peripheral device, and wherein the interactive display screen comprises a watch face display.

4. The power and data housing assembly of claim 1, wherein the interactive display screen is an interactive digital display operable to provide interactive functionality comprising at least one of: text messaging, timing keeping, calendar functionalities, calculations, game-playing, audio players, and video media players.

5. The power and data housing assembly of claim 1, wherein the electronic device assembly is communicatively coupled to the at least one peripheral device via a wireless link, and wherein the wireless link comprises at least one of a Bluetooth connection, a near field communication (NFC) connection, and a Wi-Fi wireless connection.

6. The power and data housing assembly of claim 1, wherein the electronic device assembly is communicatively coupled to the at least one peripheral device via a wired connection.

7. A power and data housing assembly configured to support at least one electronic device, the power and data housing assembly comprising:

a housing body configured for coupling to a work surface in a work area;

an AC electrical power output receptacle retained and supported by the housing body;

an electronic device assembly retained and supported by the housing body, the electronic device assembly comprising an interactive display screen and associated electronics, wherein a face of the AC electrical power output receptacle and the interactive display screen of the electronic device are oriented along respective parallel planes;

wherein the electronic device assembly is communicatively coupled to at least one peripheral device, wherein the at least one peripheral device comprises one or more weather devices chosen from at least one of thermometers, barometers, rain sensors, and wind sensors;

wherein the interactive display screen is configured to provide interactive control of the at least one peripheral device at the interactive display screen; and wherein the interactive display screen and the associated electronics are operable to display information that is communicated to the electronic device assembly from the at least one peripheral device.

8. The power and data housing assembly of claim 1, wherein the at least one peripheral device comprises at least one of speakers, memory card interfaces, and an electronic peripheral device configured to send and/or receive analog and/or digital data.

9. The power and data housing assembly of claim 7, wherein the electronic device assembly is configured to remotely control the at least one peripheral devices.

10. The power and data housing assembly of claim 1, wherein the electronic device assembly comprises enterprise level control and data output functionality.

11. The power and data housing assembly of claim 10, wherein the enterprise level control functionality provides data output that is user independent.

12. The power and data housing assembly of claim 10, wherein the enterprise level control functionality provides at least one of local thermostatic, lighting, and power controls.

13. The power and data housing assembly of claim 1, wherein a second electronic device assembly is retained and supported by the housing body.

14. A method for providing interactive functionality between a peripheral device and an electronic device assembly retained and supported by a power and data housing assembly that is coupleable to a work surface in a work area, wherein the method comprises:

communicating peripheral device configuration data from one or more peripheral devices to the electronic device assembly;

providing one or more enterprise functions or controls via an interactive display screen at the electronic device assembly, based upon the configuration data communicated by the one or more peripheral devices;

wherein the providing one or more enterprise functions or controls comprises providing interactive control of the one or more peripheral devices at the interactive display screen, and further providing information at the interactive display screen that is communicated from the one or more peripheral devices, wherein the providing interactive control between the one or more peripheral devices and the electronic device assembly further comprises the electronic device assembly remotely controlling a peripheral device; and wherein the power and data housing assembly retains and supports an AC electrical power output receptacle to orient a face of the AC electrical power output receptacle and the interactive display screen of the electronic device assembly along respective parallel planes.

15. The method of claim 14, wherein the one or more peripheral devices includes at least one of: a handheld computer, a thermometer, a barometer, a rain sensor, a wind sensor, a thermostat, a lighting control, an audio speaker, and a memory card interface.

16. The method of claim 14, wherein the method further provides additional interactive control and information flow at the electronic device assembly, the additional interactive control and information flow comprising one or more functions, the one or more functions comprising text messaging, time-keeping, calendar functionality, calculations, game-playing, audio playback, and video media playback.

17. The method of claim 14, wherein configuration data is communicated from the electronic device assembly to the peripheral device via one or more of wired and wireless communications links.

18. The power and data housing assembly of claim 1, wherein the AC electrical power output receptacle comprises an AC high-voltage electrical power output receptacle.

19. The power and data housing assembly of claim 1, wherein the AC electrical power output receptacle and the interactive display screen of the electronic device are mounted adjacent to one another at said housing.

20. A power and data housing assembly configured to support at least one electronic device, the power and data housing assembly comprising:
- a housing body configured for coupling to a work surface in a work area;
- an AC high-voltage electrical power output receptacle retained and supported by the housing body;
- an electronic device assembly retained and supported by the housing body, the electronic device assembly comprising a touch-sensitive interactive display screen and associated electronics, wherein the AC high-voltage electrical power output receptacle and the interactive display screen of the electronic device are mounted adjacent to one another at said housing;
- wherein the interactive display screen is configured to provide interactive functionality and information; and
- wherein the electronic device assembly is configured to remotely control at least one peripheral device.

21. The power and data housing assembly of claim 20, wherein the electronic device assembly is configured to wirelessly communicate with the peripheral device.

22. The power and data housing assembly of claim 21, wherein the peripheral device includes one of a cellphone, a second electronic device assembly, a weather sensor, an audio and/or video device, and a memory interface.

23. The power and data housing assembly of claim 3, wherein the electronic device assembly is configured to remotely control the at least one peripheral device.

24. The power and data housing assembly of claim 20, wherein the electronic device assembly comprises enterprise level control and data output functionality, wherein the enterprise level control functionality provides data output that is user independent, and wherein the enterprise level control functionality further provides at least one of local thermostatic, lighting, and power controls.

* * * * *